US 8,790,093 B2

(12) United States Patent
Grosskopf et al.

(10) Patent No.: US 8,790,093 B2
(45) Date of Patent: Jul. 29, 2014

(54) COMPRESSOR HAVING A CLUTCH DEVICE

(75) Inventors: Joachim Grosskopf, Ronnenberg (DE); Ralf Stoffels, Gerdau (DE); Ingo Stumberg, Hannover (DE)

(73) Assignee: WABCO GmbH, Hannover (DE)

( * ) Notice: Subject to any disclaimer, the term of this patent is extended or adjusted under 35 U.S.C. 154(b) by 67 days.

(21) Appl. No.: 13/265,082

(22) PCT Filed: Jan. 16, 2010

(86) PCT No.: PCT/EP2010/000227
§ 371 (c)(1),
(2), (4) Date: Nov. 7, 2011

(87) PCT Pub. No.: WO2010/127727
PCT Pub. Date: Nov. 11, 2010

(65) Prior Publication Data
US 2012/0063926 A1 Mar. 15, 2012

(30) Foreign Application Priority Data
May 6, 2009 (DE) .......................... 10 2009 020 070

(51) Int. Cl.
F04B 9/00 (2006.01)
F04B 9/02 (2006.01)
F04B 9/06 (2006.01)
F16D 25/08 (2006.01)
F04B 39/14 (2006.01)
F04B 39/00 (2006.01)

(52) U.S. Cl.
CPC .............. *F16D 25/087* (2013.01); *F04B 39/14* (2013.01); *F04B 39/0094* (2013.01)
USPC ...... 417/319; 417/223; 192/85.17; 192/85.37

(58) Field of Classification Search
USPC ...................... 417/223, 319; 192/85.17, 85.37
See application file for complete search history.

(56) References Cited

U.S. PATENT DOCUMENTS

| 4,561,827 | A | * | 12/1985 | Beaumont | 417/223 |
| 4,632,639 | A | * | 12/1986 | Beaumont | 417/223 |
| 4,648,805 | A | * | 3/1987 | Beaumont | 417/223 |
| 4,657,127 | A |   | 4/1987 | Boffelli | |
| 4,901,837 | A | * | 2/1990 | Wheeler | 192/85.53 |
| 6,056,516 | A |   | 5/2000 | Schonfeld et al. | |

FOREIGN PATENT DOCUMENTS

| DE | 197 45 118 A1 | 4/1999 |
| DE | 20 2006 019 190 U1 | 5/2008 |
| EP | 1 950 445 A2 | 7/2008 |
| EP | 1 995 482 A1 | 11/2008 |

* cited by examiner

*Primary Examiner* — Peter J Bertheaud
(74) *Attorney, Agent, or Firm* — Kramer Levin Naftalis & Frankel LLP

(57) ABSTRACT

A compressor for generating compressed air in a vehicle includes a crankshaft and an interface area for fastening a clutch device by means of which the crankshaft of the compressor can be connected to or disconnected from a drive device. The interface area is configured to receive a crucible-shaped receptacle element. The crucible-shaped receptacle element can be a cylinder for receiving a piston that can be acted on by a pressure medium for actuating the clutch device.

8 Claims, 3 Drawing Sheets

COMPRESSOR HAVING A CLUTCH DEVICE

FIELD OF THE INVENTION

The present invention generally relates to embodiments of a compressor for generating compressed air in a vehicle. The compressor can be separated from or connected to a drive by means of a clutch device, for example a shut-off clutch.

BACKGROUND OF THE INVENTION

A generic compressor is known for example from DE 20 2006 019 190 U1.

The use of the known shut-off clutch on compressors has the advantage that the compressor can be separated from a drive, for example the drive engine of the vehicle, in order to save energy when no compressed air generation is required. Without such a shut-off clutch, it has hitherto been conventional for the compressor to always be driven along by the drive engine and to merely be switched into a pneumatically neutral state in phases in which no compressed air generation was required.

In the case of known compressors, it was necessary for these to be structurally adapted to the clutch device such that the compressor and clutch device form a unit. An adaptation of the structure of the compressor however requires in each case a relatively expensive and complex change of the production facilities, in particular of the casting moulds.

SUMMARY OF THE INVENTION

Therefore, it is an object of the invention to improve the interface between the compressor and the clutch device such that the adaptation expenditure is reduced.

The inventive embodiments have the advantage of specifying a modular concept for the compressor and the clutch device. The compressor may be used and sold both without and with a clutch device. The clutch device may be connected to the compressor as a separate auxiliary module. In this way, compressors can be produced with a uniform housing for applications both with and without a clutch device, which leads to a rationalization in terms of production.

According to an embodiment of the present invention, an annular, pot-shaped receiving element is provided, which can be produced and provided as a separate component. The pot-shaped receiving element is adapted in terms of its shape to the interface region of the compressor and can be mounted thereon in a simple manner. Through the use of different pot-shaped receiving elements as adapters, it is possible for different combinations of compressors and clutch devices to be connected to one another. The relatively complex adaptation of the compressor housing or of parts of the clutch device is thereby made superfluous.

Furthermore, the receiving element can be cylindrical. The pot-shaped receiving element is designed for receiving a piston, which can be acted on with pressure medium, for actuating the clutch device. As pressure medium, consideration is given for example to compressed air or pressurized oil. In this way, the pot-shaped receiving element serves additionally for the integration of the piston required for the actuation of the clutch. It is advantageously possible for an actuating piston pre-mounted in the receiving element to be arranged as a structural unit on the compressor. In this way, the clutch device can be arranged on the compressor in an easy-to-assemble manner. Furthermore, use may be made of a structural unit, which has been checked for functionality in advance, composed of the pot-shaped receiving element and the actuating piston, which reduces the testing expenditure for the finished compressor-clutch unit.

In one advantageous embodiment of the invention, the pot-shaped receiving element can be fixed in a depression of the compressor housing by means of a corrugated locking ring. The use of a corrugated locking ring permits not only secure fastening but at the same time also play-free mounting of the pot-shaped receiving element. As a result of the corrugated contour of the locking ring, a certain preload is imparted to the pot-shaped receiving element, such that the latter is held in a play-free manner.

In another embodiment of the invention, the clutch device can be fastened on the crankshaft by means of a collar nut. It is advantageously possible here for a relatively flat collar nut to be used. Simple and substantially simultaneous space-saving mounting of the clutch device on the crankshaft is possible in this way.

Still other objects and advantages of the present invention will in part be obvious and will in part be apparent from the specification.

The present invention accordingly comprises the features of construction, combination of elements, and arrangement of parts all as exemplified in the constructions herein set forth, and the scope of the invention will be indicated in the claims.

BRIEF DESCRIPTION OF THE DRAWINGS

The invention will be explained in more detail below on the basis of exemplary embodiments, with reference to the appended drawings, in which.

DETAILED DESCRIPTION OF THE PREFERRED EMBODIMENTS

Figure 1:
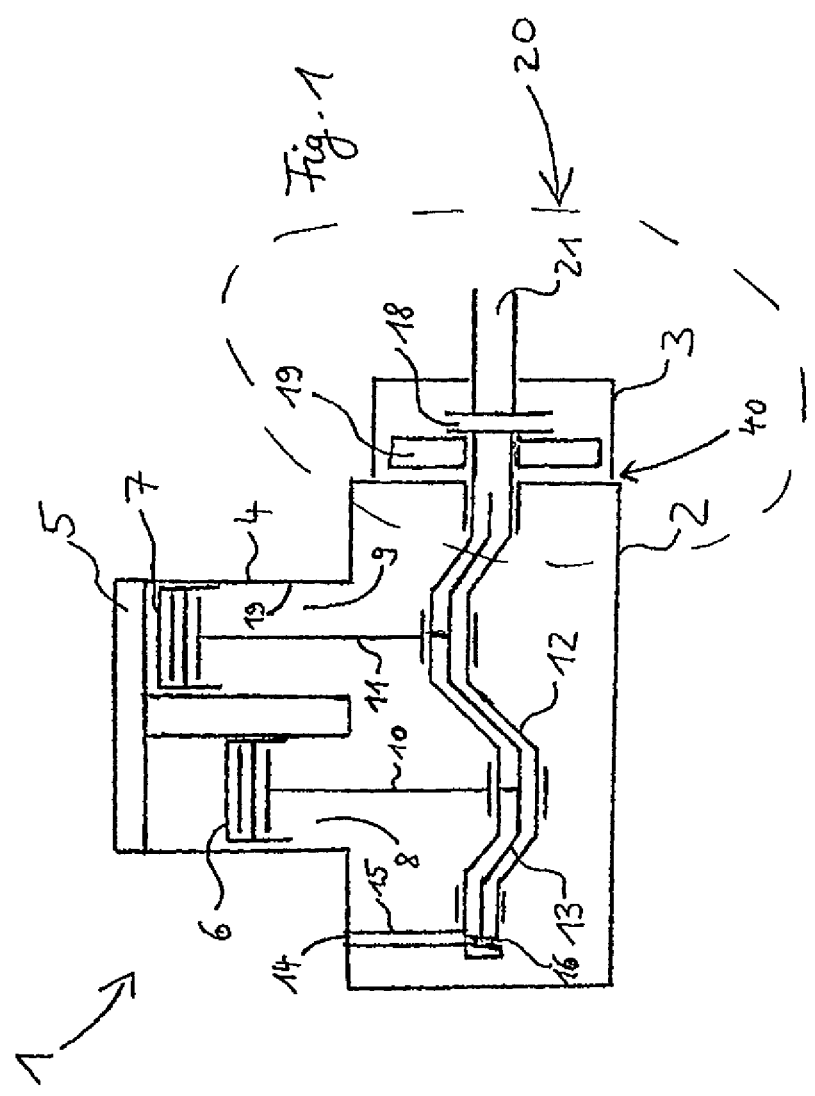
FIG. 1 is a schematic illustration of a two-cylinder compressor.

Referring now to the drawing figures, where the same reference numerals are used for corresponding elements, FIG. 1 shows a compressor 1 having a compressor housing 2, and a clutch device 3, which is arranged on the compressor housing 2. The clutch device 3 is designed as a pneumatically actuable shut-off clutch. For this purpose, the clutch device 3 has a pneumatic actuating cylinder 19 by means of which, when it is subjected to pneumatic loading, coupling 18, for example clutch plates or clutch discs, can be pressed against one another or separated from one another. The clutch device 3 connects a crankshaft 12 of the compressor 1 via a clutch drive shaft 21 to a drive output shaft of a drive device (not illustrated in granular detail) of a vehicle, for example the vehicle engine. The clutch drive shaft 21 may be provided with a receptacle for a gearwheel for a gearwheel drive.

The compressor 1 has a first cylinder 8 and a second cylinder 9. A first piston 6 is arranged in the first cylinder 8. A second piston 7 is arranged in the second cylinder 9. The first piston 6 is connected to the crankshaft 12 via a first connecting rod 10 and corresponding bearings. The second piston 7 is connected to the crankshaft 12 via a second connecting rod 11 and likewise via corresponding bearings. The mounting of the pistons 6, 7 and of the crankshaft 12 in the corresponding bearing eyes of the connecting rods 10, 11 is illustrated merely schematically in FIG. 1 for simplicity. In practice, suitable plain or rolling bearings are used for this purpose. The cylinders 8, 9 are arranged in a cylinder housing 4 of the compressor 1. The cylinder housing 4 is part of the housing 2.

Arranged on the cylinder housing 4 is a valve and control block 5, which comprises for example the inlet and outlet valves for the compressed-air induction and for the compressed-air discharge to downstream units such as for example compressed-air storage reservoirs. The valve block 5 may be designed, in terms of detail, for example as per DE 197 451 18 A1.

For lubrication of the pistons 6, 7 in the respective cylinders 8, 9, the compressor 1 has a lubricant supply. As lubricant, use is made for example of oil, for example the engine oil of the vehicle engine. The lubricant supply of the compressor 1 has a lubricant port 14 for connecting to the engine oil supply of the vehicle engine. From the lubricant port 14, a first lubricant duct 15 leads through the housing 2 to a lubricant supply groove 16, which runs around the crankshaft 12. The lubricant supply groove 16 is connected to a lubricant supply duct section 13, which runs in the form of a hollow duct within the crankshaft 12. The duct section 13 is connected to outlet points for the lubricant in the region of the connecting rods 10, 11. The use of the encircling lubricant supply groove 16 has the advantage that the lubricant can disperse over the circumference of the crankshaft 12 and thereby be introduced relatively quickly and uniformly into the lubricant duct section 13.

The lubricant is conventionally pressurized and is at a pressure of approximately 3 to 4 bar. In this way, a supply of lubricant is possible independently of the movement of the compressor, that is even when the compressor is stationary.

As can also be seen from FIG. 1, in one advantageous embodiment of the invention, the clutch device 3 protrudes beyond the housing 2 of the compressor 1, that is the clutch device is not integrated into the housing, as is known from DE 20 2006 019 190 U1. The clutch device 3 protrudes at least with a region that comprises the coupling 18, for example the clutch disc or plate part, out of the housing 2 of the compressor 1. The external arrangement of the clutch device offers the advantage of modularity. The inventive compressor can therefore be used, without any structural changes, both with and without a clutch device. If required, the clutch device 3 is merely screwed onto the housing 2 of the compressor 1.

Figure 2:
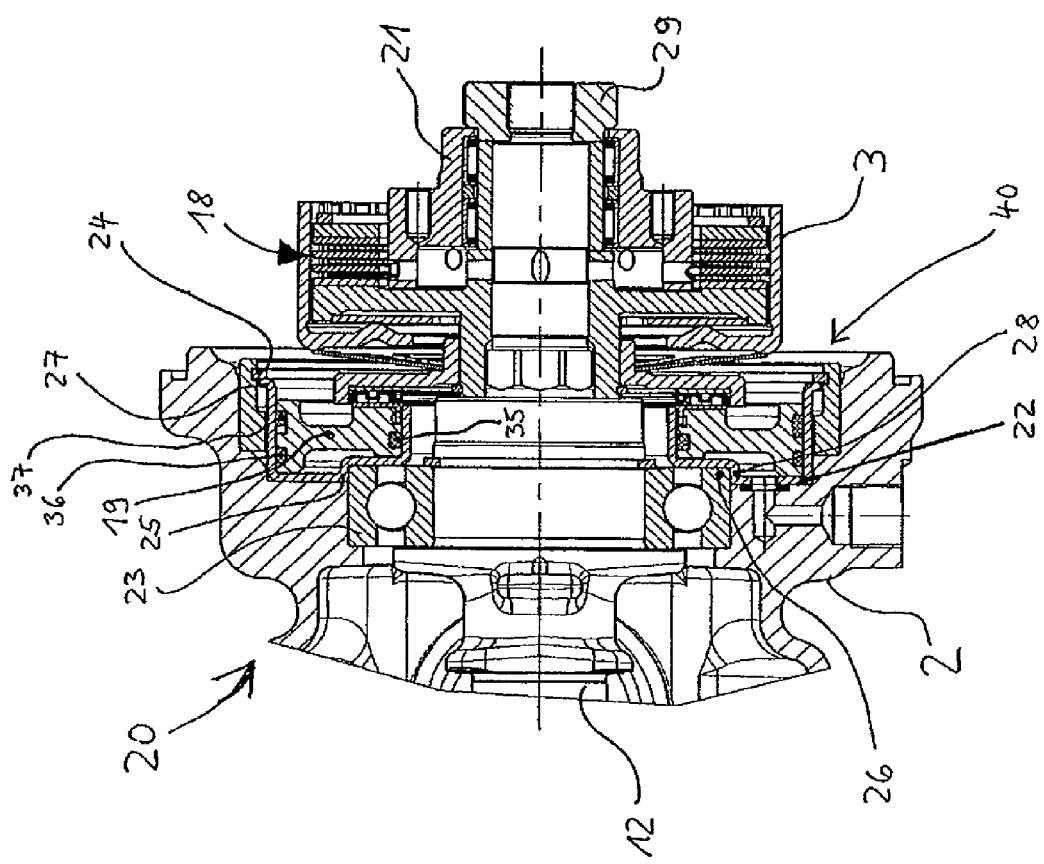
FIG. 2 is a sectional view showing the compressor/clutch device interface.

The region 20 bordered by a dashed line in FIG. 1 is illustrated in FIG. 2 in the form of an enlarged detail. FIG. 2 shows an interface region 40 of the compressor 1 to the clutch device 3 in a horizontal sectional illustration. As is shown, the crankshaft 12 is mounted in the housing 2 by means of a ball bearing 23. An annular, pot-shaped receiving element 22 is arranged in a depression of the compressor housing in the illustrated position by means of a corrugated locking ring 24. For this purpose, the pot-shaped receiving element 22 has an annularly outwardly flanged edge 27 on which the locking ring 24 is seated.

The pot-shaped receiving element 22 simultaneously serves as a cylinder for a compressed-air-actuable piston 19. The compressed-air-actuable piston 19 is sealed off with respect to the pot-shaped receiving element 22 by means of seals 35, 36 at the inside and at the outside. Also situated on the outside of the piston 19 is a guide belt 37. The piston 19 serves for actuating the clutch device 3. When subjected to compressed air loading, the piston 19 is deployed to the right in the illustration of FIG. 2 and hereby opens the clutch device 3, or the coupling 18. The crankshaft 12 is then separated from the drive shaft 21, which is connected to the drive device, of the clutch device 3, such that the compressor 1 is not driven.

As can also be seen from FIG. 2, the bearing 23 protrudes with a section 26 out of the compressor housing 2. The section 26 serves simultaneously as a centering device for the pot-shaped receiving element 22. For this purpose, the pot-shaped receiving element 22 is provided with a centering shoulder, that is an annular depression 25, 28, which is matched in terms of its diameter to the outer diameter of the bearing 23. Simple and fast centred mounting of the pot-shaped receiving element 22 on the compressor housing 2 is possible by means of the centering shoulder 25, 28 and the centering device 26. The bearing 23 advantageously simultaneously serves for mounting the shaft 21 of the clutch device 3. In this way, aside from the needle-roller bearings provided in the clutch device 3 in any case for a free wheel, no additional bearings and no further housing is required, which promotes a relatively inexpensive realization of the invention.

The clutch device 3 is fastened on the crankshaft 12 by means of the collar nut 29.

Figure 3:
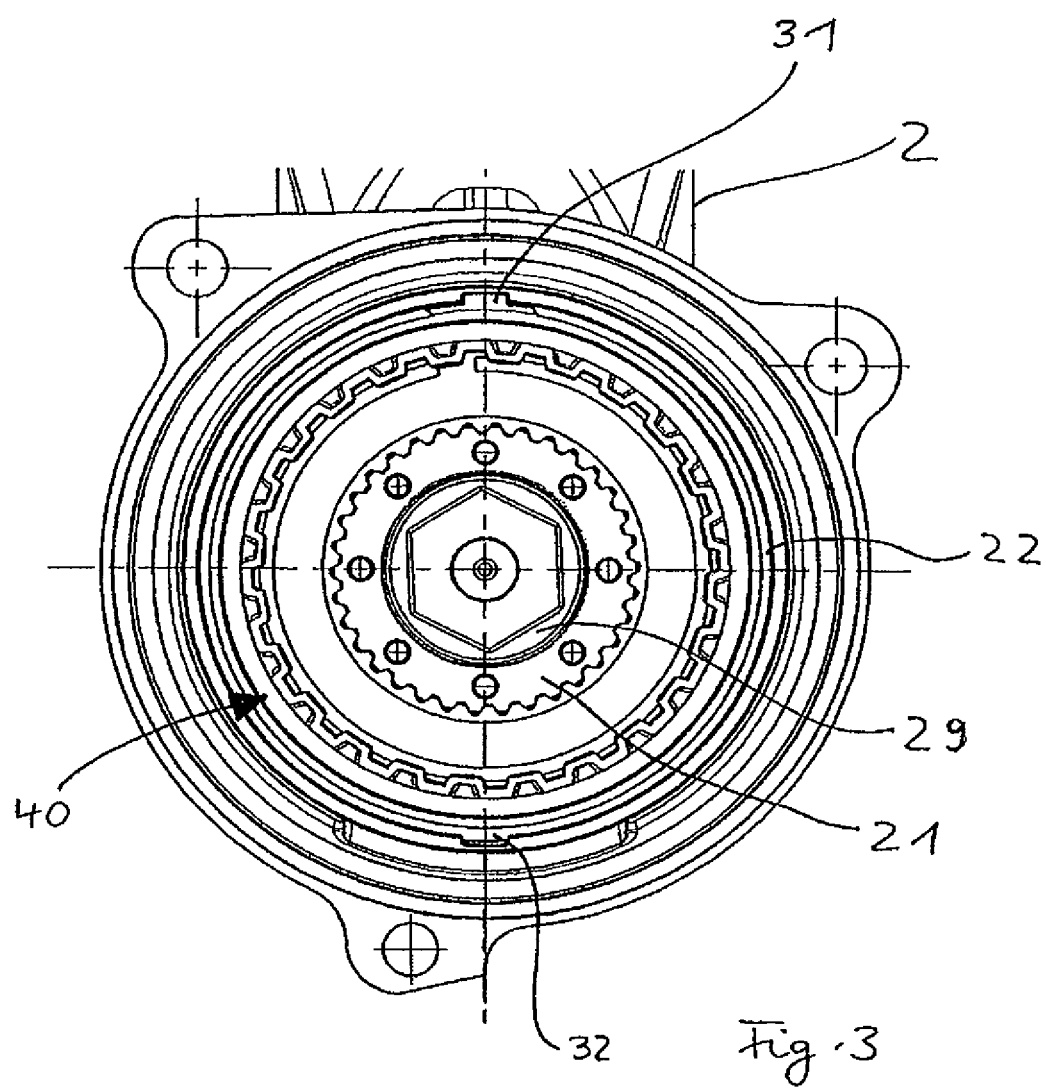
FIG. 3 is a view of the compressor from the shaft side.

FIG. 3 shows a detail of the compressor 1 in a view from the side of the shaft, with the clutch device 3 not mounted. The pot-shaped receiving element 22 has a rotation-preventing lock in the form of projecting lugs, which engage with complementarily shaped rotation-preventing locking devices 31, 32 integrally formed in the compressor housing. The rotation-preventing locking devices 31, 32 are formed as depressions in the compressor housing 2. It is also conceivable for the rotation-preventing locking devices 31, 32 to be formed in the compressor housing 2 as projecting locking lugs, with complementary depressions formed in the pot-shaped receiving element 22. The pot-shaped receiving element 22 can be locked, so as to be prevented from rotating relative to the compressor 1, by such construction.

As is evident from the above description, the pot-shaped receiving element 22 constitutes a significant improvement in the region of the interface between a compressor and a clutch device. The pot-shaped receiving element is, so to speak, a multifunctional part that integrates a multiplicity of structural improvements together in the interface region 40. The pot-shaped receiving element may advantageously be produced relatively inexpensively as a metal deep-drawn part. The inventive embodiments can be realized inexpensively in this way.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A compressor for generating compressed air in a vehicle, the compressor comprising:
   a housing;
   a crankshaft;
   an interface region for fastening to a modular clutch device such that the crankshaft is connectable to and separable from a drive device, the interface region being configured to receive a receiving element, the receiving element being configured to receive a piston that can be acted on with a pressure medium for actuating the modular clutch device, and the receiving element being fixable in the compressor housing; and
   at least one crankshaft bearing in the interface region, at least a part of the at least one crankshaft bearing protruding out of the compressor housing for centering the receiving element on the crankshaft, wherein the protruding part of the at least one crankshaft bearing is assigned to a centering shoulder on the receiving element and contacts the centering shoulder when the receiving element is mounted on the compressor.

2. The compressor according to claim 1, wherein the compressor housing has a depression defined therein, the receiving element being fixable in the depression by a corrugated locking ring.

3. The compressor according to claim 1, wherein the modular clutch device is fastenable on the crankshaft by a collar nut.

4. The compressor according to claim 2, wherein the modular clutch device is arranged on the compressor housing and projects outwardly from the compressor housing at least with a region comprising at least one coupling device.

5. The compressor according to claim 1, further comprising a rotation-preventing locking device engageable with a complementarily shaped portion of the receiving element such that when mounted on the compressor the receiving element is locked against rotation.

6. The compressor according to claim 1, wherein the crankshaft bearing is also a bearing of the modular clutch device when the modular clutch device is mounted on the compressor.

7. The compressor according to claim 1, wherein the receiving element is crucible-shaped.

8. The compressor according to claim 1, wherein the receiving element is cylindrical.

\* \* \* \* \*